2,716,030

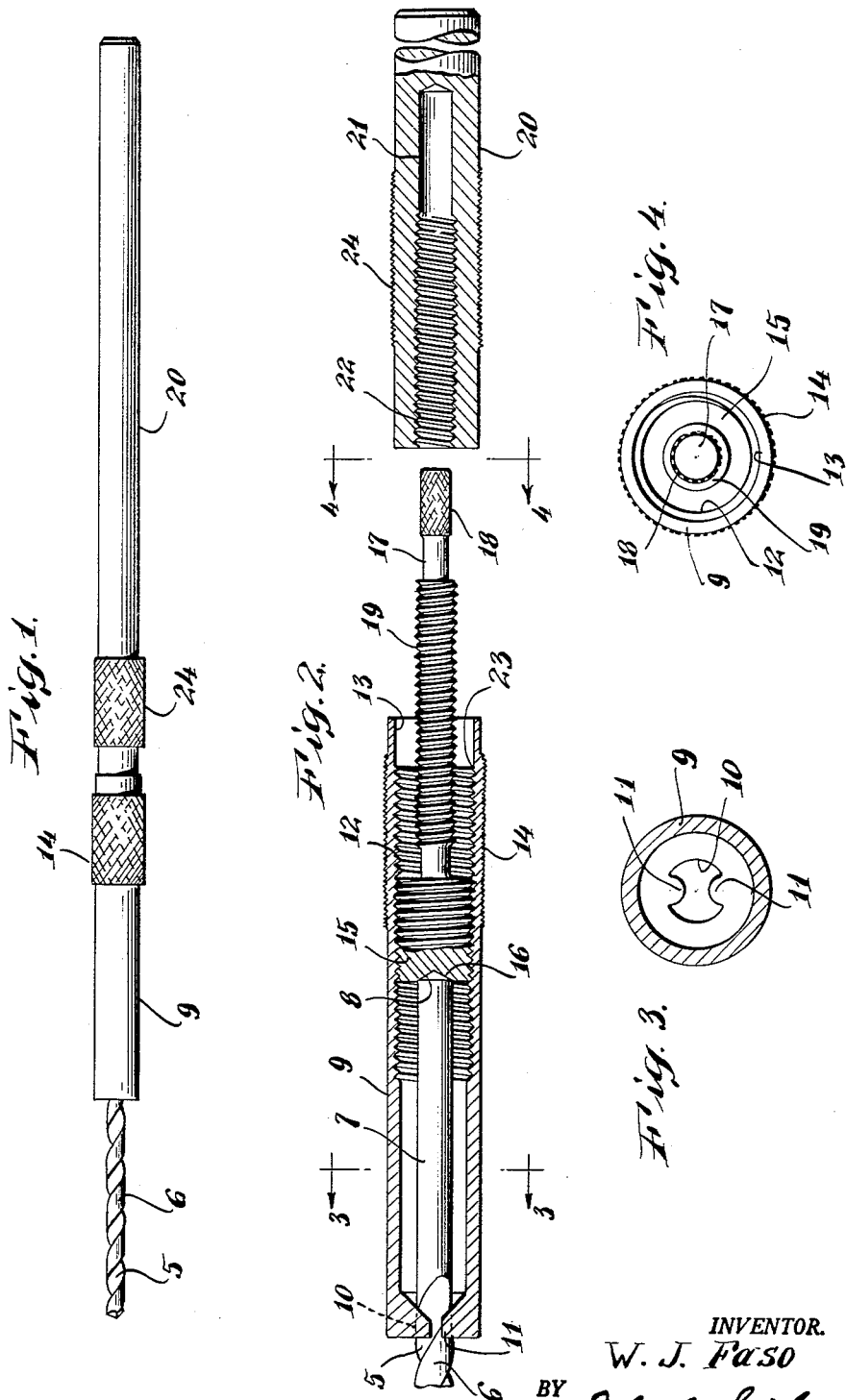

EXTENSION CHUCK FOR PIERCING TOOLS

William J. Faso, Huntington Station, N. Y.

Application November 9, 1953, Serial No. 390,999

4 Claims. (Cl. 279—9)

This invention relates to extension chucks for piercing tools, such as twist drills, reamers, taps and the like.

The present invention is an improvement of the combination piercing tool, chuck member and extension rod disclosed in my pending application for patent Serial No. 364,607, filed June 29, 1953.

It has been found that by continuous piercing operation of the combination disclosed in my pending application, the locking member becomes loose in the chuck member thereby permitting the tool to turn freely in the chuck member and extend eccentrically of the chuck member which may cause the tool to break and will in any event compel stopping of the piercing operation to permit tightening of the locking member.

It is the object of the present invention to overcome this disadvantage of the combination disclosed in my pending application by providing a locking connection between the locking member and the extension rod which will be tightened by the driving rotation of the extension rod.

Other objects and advantages of the invention will be set forth in the detailed description of the invention.

The drawing accompanying and forming a part of this application comprises:

Figure 1 showing the assembled tool, chuck member and extension rod;

Figure 2 showing a longitudinal-sectional view, on an enlarged scale, with the tool and extension rod partly shown and the extension rod removed from the chuck member to show the locking means of the locking member and extension rod;

Figure 3 showing a cross-sectional view taken on the line 3—3 of Figure 2 looking in the direction of the arrows; and Figure 4 showing an end view of the chuck member looking from the line 4—4 of Figure 2 in the direction of the arrows.

The invention is particularly adapted for use with a twist drill having spiral flutes 5 and spiral blades 6 at one end portion and a smooth shank portion 7 at the opposite end, as shown in Figure 2. The end of the shank portion 7 is of conical shape, as shown at 8 in Figure 2.

The twist drill is removably mounted in a chuck member comprising a tubular member 9 having an internal diameter or bore substantially larger than the diameter of the twist drill. One end of the tubular member 9 is arranged with an opening 10 of a diameter to form a sliding fit with the spiral blades 6 of the twist drill and having diametrically opposed projections 11 of arcuate or curved configuration extending into the opening to form a sliding fit with the spiral flutes 5 of the twist drill, as shown in Figures 2 and 3. The number and position of the projections 11 may be varied corresponding to the tool being used. An intermediate portion of the bore of the tubular member 9 is provided with screw threads 12 spaced a greater distance from the opening 10 and projections 11 than from the opposite end of the tubular member 9. The portion of the bore between the screw threads 12 and said opposite end of the tubular member 9 is of enlarged diameter, as shown at 13 in Figures 2 and 4. To facilitate handling of the chuck member, the outer surface of the tubular member 9 is knurled, as at 14, at the end portion arranged with the enlarged bore portion 13.

The twist drill is assembled in the tubular member 9 by inserting the twist drill with the spiral flutes 5 and spiral blades 6 foremost into the enlarged diameter bore portion 13 and engaging the spiral flutes 5 and spiral blades 6 with the projections 11 and opening 10, respectively. The forward movement of the twist drill is arrested by the shank portion 7 abutting the projections 11, as shown in Figure 2. The twist drill is retained in the tubular member 9 with the spiral flutes 5 and spiral blades 6 extending from the tubular member 9 and the shank portion 7 abutting the projections 11. This is accomplished by a locking member in the form of a screw threaded plug 15 adjustably engaged with the screw threads 12 of the tubular member 9. One end of the plug 15 is arranged with a conical recess 16 to engage the conical end 8 of the twist drill and center the twist drill in the bore of the tubular member 9. The opposite end of the plug 15 is provided with a stem 17 of a length to project from the enlarged bore end 13 of the tubular member 9 when the conical recess 16 abuts the conical end 8, as shown in Figure 2. To facilitate manipulation of the plug 15, the end of the stem 17 is knurled, as at 18 in Figures 2 and 4. To provide the locking improvement of the present invention, the portion of the stem 17 between the plug 15 and the knurl 18 is provided with screw threads 19. The function and operation of these screw threads will be described hereinafter. When the plug 15 is secured in position to hold the shank portion 7 against the projections 11, the projections 11 engaging the spiral flutes 5 will prevent turning of the drill in the chuck member during the piercing or drilling operation.

The assembled twist drill and chuck member may be stored until required, and they are operatively connected to driving mechanism, not shown, by an extension rod 20 having an axial elongated recess 21 extending into an end portion of the extension rod and arranged with screw threads 22 extending from the opening of the recess in the end of the rod to an intermediate portion of the recess. The end of the rod 20 has a sliding fit with the enlarged end portion 13 of the chuck member while the screw threads 22 are engaged with the screw threads 19 on the locking member stem 17. The screw threads 22 are engaged with the screw threads 19 after the locking member 15 is hand tightened against the drill shank 7. The screw threads 19 and 22 are so arranged that the driving rotation of the rod 20 will tighten the connection between the locking member stem 17 and the extension rod 20 to assure retaining the locking member against the drill shank 7 and thereby preventing loosening of the drill during the piercing operation. The adjustment of the extension rod 20 into the chuck member 9 is limited by the end of the extension rod 20 abutting a shoulder 23 formed between the screw threaded bore portion 12 and the enlarged end bore portion 13 of the chuck member. To facilitate tightening of the extension rod on the locking member 17 the extension rod is knurled at 24. The knurled end portion 18 of the locking member stem 17 will guide the screw threads 19 into engagement with the screw threads 22. The engagements of the locking member stem 17 in the recess 21, and of the end portion of the extension rod 20 in the enlarged end portion 13 will maintain the chuck member and extension rod in alignment with each other.

Having thus described my invention, I claim:

1. An extension chuck for piercing tools comprising a tubular chuck member having a bore of greater diameter than the diameter of the tool and arranged at one end to hold the tool in piercing position, a locking member adjustably mounted in an intermediate portion of the chuck member and having a stem of less diameter than the bore of the chuck member extending from one end of the locking member concentrically of the bore of the chuck member and adapted to project from the end of the chuck member opposite the tool holding end with the opposite end of the locking member abutting the end of the tool within the chuck member, and an extension rod having an elongated recess extending into one end portion of the extension rod and arranged to interlock with the stem of the locking member and retain the locking member against the tool in piercing position.

2. An extension chuck for piercing tools as claimed in claim 1, wherein the end portion of the bore of the chuck member opposite the tool holding end is of enlarged diameter and provided with a shoulder between the enlarged diameter portion and the bore of the chuck member, and the extension rod has a sliding fit with the enlarged diameter portion and the end of the extension rod is adapted to abut the shoulder to limit adjustment of the extension rod into the chuck member.

3. An extension chuck for piercing tools as claimed in claim 1, wherein the stem of the locking member and the elongated recess in the extension rod are provided with engaging screw threads to form the interlocking engagement between the locking member stem and the recess.

4. An extension chuck for piercing tools as claimed in claim 1, wherein the intermediate portion of the stem of the locking member and the outer end portion of the recess in the extension rod are arranged with engaging screw threads to form the interlocking engagement between the locking member stem and recess, and the outer end portion of the locking member stem adapted to guide the screw threads of the locking member stem into engagement with the screw threads in the recess of the extension rod.

References Cited in the file of this patent

UNITED STATES PATENTS

| | | |
|---|---|---|
| 206,006 | Crockford | July 16, 1878 |
| 1,475,514 | Ross | Nov. 27, 1923 |
| 2,365,810 | Faso | Dec. 26, 1944 |
| 2,451,922 | Cox | Oct. 19, 1948 |